United States Patent
Xu et al.

(10) Patent No.: US 7,466,694 B2
(45) Date of Patent: Dec. 16, 2008

(54) ROUTING PROTOCOL WITH PACKET NETWORK ATTRIBUTES FOR IMPROVED ROUTE SELECTION

(75) Inventors: Xiaode Xu, Fremont, CA (US); Manjunath S. Bangalore, San Jose, CA (US); Dhaval Shah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 11/450,624

(22) Filed: Jun. 10, 2006

(65) Prior Publication Data

US 2007/0286175 A1    Dec. 13, 2007

(51) Int. Cl.
*H04L 12/66* (2006.01)
(52) U.S. Cl. ............... 370/352; 370/236; 370/389; 709/230
(58) Field of Classification Search ............... 370/236, 370/259, 352, 389; 709/227, 230
See application file for complete search history.

(56) References Cited

U.S. PATENT DOCUMENTS

| | | | |
|---|---|---|---|
| 4,684,872 A | 8/1987 | Stewart | |
| 6,044,081 A | 3/2000 | Bell et al. | |
| 6,253,270 B1 | 6/2001 | Ajanovic et al. | |
| 6,275,889 B1 | 8/2001 | Saito | |
| 6,298,057 B1 * | 10/2001 | Guy et al. | 370/389 |
| 6,590,867 B1 * | 7/2003 | Ash et al. | 370/236 |
| 6,771,644 B1 | 8/2004 | Brassil et al. | |
| 6,876,632 B1 * | 4/2005 | Takeda | 370/259 |
| 6,947,417 B2 | 9/2005 | Laursen et al. | |
| 2002/0014282 A1 | 2/2002 | Andersson et al. | |
| 2002/0186661 A1 | 12/2002 | Santiago et al. | |
| 2003/0076850 A1 | 4/2003 | James, Jr. | |
| 2003/0163272 A1 | 8/2003 | Kaburlasos et al. | |
| 2004/0073690 A1 * | 4/2004 | Hepworth et al. | 709/230 |
| 2004/0213152 A1 | 10/2004 | Matuoka et al. | |
| 2005/0007959 A1 | 1/2005 | Tomonaga et al. | |
| 2006/0235980 A1 * | 10/2006 | Pote et al. | 709/227 |

FOREIGN PATENT DOCUMENTS

EP    1 553 735 A1    7/2005

* cited by examiner

*Primary Examiner*—Gerald Gauthier
(74) *Attorney, Agent, or Firm*—The Law Offices of Bradley J. Bereznak

(57) ABSTRACT

A node for routing of calls in a network has an interface coupled to the network and at least one processor operable to route a packet-based call to a telephony destination in accordance with a protocol that includes a set of attributes that describe packet-network routing characteristics of one or more Internet Protocol (IP)-IP gateway devices in the network. The attributes are used by the at least one processor to specify a call route through an IP-IP gateway device for the packet-based call. The set of attributes include a first attribute that identifies a total administratively provisioned bandwidth capacity available on a given call route to accommodate application traffic, and a second attribute that identifies a current bandwidth that is available on the given call route to accommodate the application traffic at a given point in time. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72 (b).

9 Claims, 3 Drawing Sheets

ROUTING PROTOCOL WITH PACKET NETWORK ATTRIBUTES FOR IMPROVED ROUTE SELECTION

FIELD OF THE INVENTION

The present invention relates generally to the field of voice networks and data packet transmission over digital networks; more specifically, to methods and apparatus for improving the routing capability of a data packet network.

BACKGROUND OF THE INVENTION

Internet Protocol (IP) routers are ubiquitously employed to transmit or forward a data packet from one network to another network based on different criteria (e.g., IP destination address) and in accordance with certain protocols. For example, telephony routing over IP (TRIP) is a general routing protocol for advertising the reachability of telephony destinations, and for advertising attributes of the routes to those destinations, irrespective of the application (signaling) protocol in use. Basically, TRIP helps in exchange of routing information among various"TRIP" Speakers, also called location servers. A location server (LS) functions to exchange and store routing information for reachability of telephony prefixes. For instance, a TRIP LS can be queried to fetch a route for a particular telephony prefix and application protocol combination. Session protocols like H.323 and Session Initiation Protocol (SIP) can query a location server for routes to reach a particular telephony prefix.

TRIP introduces a concept of IP telephony administrative domains (ITADs), which typically covers all of the devices managed by a single organization. An ITAD consists of a set of resources consisting of gateways and at least one LS. By way of example, in a H.323 network, an ITAD could consist of a set of H.323 gateways interested in advertising prefixes via the TRIP speaker. Gateways interested in advertising the prefixes they terminate can "register" with the TRIP speaker. An example of an ITAD topology that includes session routers is described in U.S. Patent Publication No. 2002/0014282.

The Telephony Gateway Registration Protocol (TGREP) was developed several years ago for registration of telephony prefixes and to advertise routes to telephony destinations in a network. Basically, TGREP provides a registration mechanism that works with TRIP to dynamically exchange routes between location servers. The location servers, in turn, can propagate the routing information within the same, and other Internet telephony administrative domains. By way of example, TGREP is the protocol commonly used for gateways having an interface into the Public Switched Telephone Network (PSTN). TGREP is described in detail in the Internet Engineering Task Force (IETF) May 2002 document http://www.ietf.org/internet-drafts/draft-ietf-iptel-tgrep-07.txt.

A voice over IP (VoIP) network typically consists of one or more ITADs that are broken into geographic Points of Presence (POP), with each POP containing some number of gateways, and a proxy server element that fronts those gateways. The proxy server is responsible for managing access to the POP, and also for determining which of the gateways will receive any given call that arrives at the POP. In conjunction with the proxy server that routes the call signaling, there are two TRIP Speaker components, the "Ingress LS" and the "Egress LS". The Ingress LS maintains TGREP peering relationship with one or more gateways. The routing information received from the gateways is further injected into the Egress LS, which in turn disseminates into the rest of the network on TRIP. The proxy server plus the two LS speaker components are often referred collectively as the proxy LS (pLS).

A call may traverse multiple ITADs before reaching its destination, e.g., either an IP phone or a PSTN phone set. Within each ITAD, one or more TRIP location servers may be present. When the call arrives at the ITAD, these LSs invoke their route selection function to decide which POP should take the call. At the selected POP, the pLS further selects a proper gateway to carry the call forward (e.g., to another POP, gateway, or another ITAD). In order for these LSs and pLSs to decide a proper route per call basis, attributes about all the usable routes must be collected and gathered for use by these LSs and pLSs as input to their route selection function.

Both TRIP and TGREP include a number of attributes that play a role in correct and efficient functioning of the protocol. For instance, the RoutedPath attribute in TRIP is used to specify the intermediate ITADs to be taken by the signaling protocol to reach the destination prefix. Similarly, TGREP defines several attributes to describe the routing status of a PSTN-gateway segment that the gateway gathers and reports to the pLS. These attributes include the TotalCircuitCapacity attribute that identifies the total number of PSTN circuits that are available on a route to complete calls. The TotalCircuit-Capacity attribute is used in conjunction with the AvailableCircuits attribute, which identifies the number of PSTN circuits that are currently available on a route. Additionally, the CallSuccess attribute is an attribute used between a gateway and its peer LS to provide information about the number of normally terminated calls out of a total number of attempted calls.

One problem with the prior art is that protocols such as TGREP and TRIP only include attributes related to routing calls through the PSTN-gateway segment. That is, none of the existing routing protocols include attributes to reflect and accommodate the IP side routing capability for both PSTN gateway and IP-IP gateway cases.

Therefore, what is needed is a solution that improves the routing capability of an IP-IP gateway and which allows an LS (pLS) to have a complete picture of a gateway's routing capability of both IP-side(s) and/or PSTN-side so that the LSs (pLSs) can make better decisions in route selection.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A mechanism for improving the routing capability of a gateway device in a telephony network is described. In the following description, numerous specific details are set forth, such as device types, protocols, network configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes, gateways, end nodes, etc. A local area network (LAN) is an example of such a subnetwork; a plurality of LANs may be further interconnected by an intermediate network node, such as a router, bridge, repeater, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component interconnect (PCI) bus. The processor subsystem may comprise multiple processor cores for their respective purposes such as routing, forwarding or IO control, or a single-chip processor combined with system controller device that incorporates a set of functions including a system memory controller, support for one or more system buses and direct memory access (DMA) engines.

Figure 1:
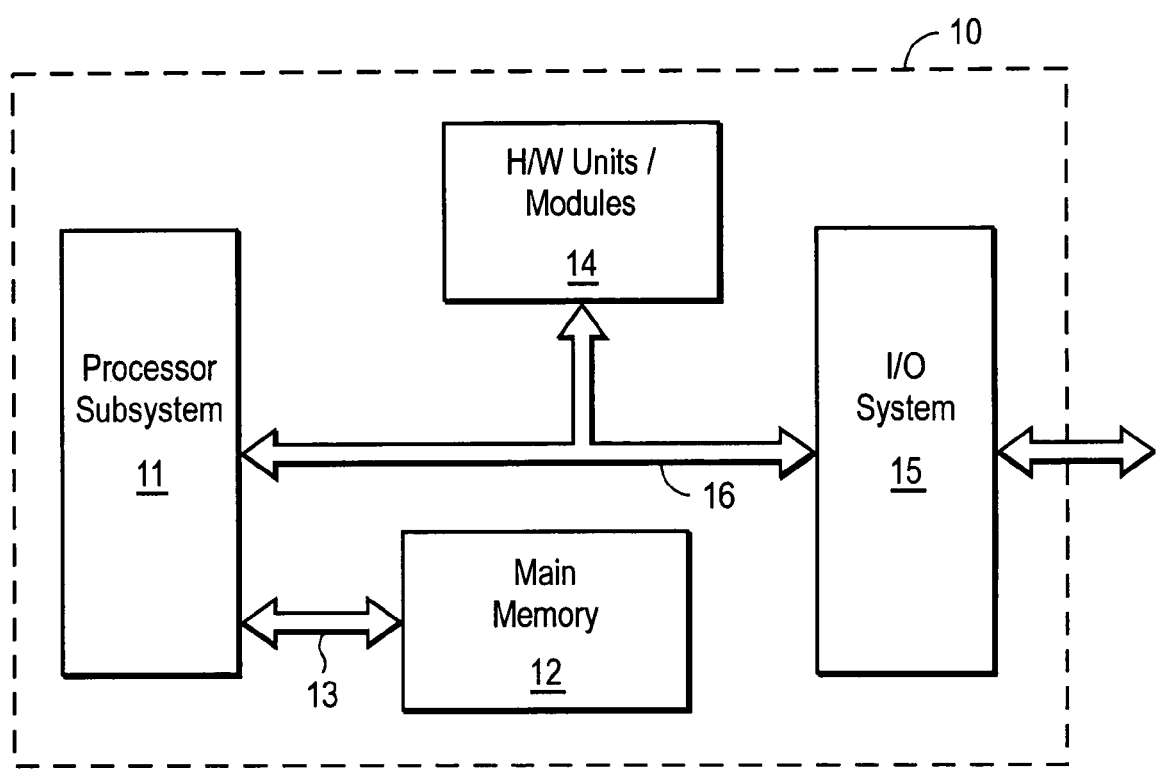
FIG. 1 is a generalized circuit schematic block diagram of a network node.

As shown in FIG. 1, each node 10 typically comprises a number of basic subsystems including a processor subsystem 11, a main memory 12 and an input/output (I/O) subsystem 15. Data is transferred between main memory ("system memory") 12 and processor subsystem 11 over a memory bus 13, and between the processor and I/O subsystems over a system bus 16. Examples of the system bus may include the conventional lightning data transport (or hyper transport) bus and the conventional peripheral component [computer] interconnect (PCI) bus. Node 10 may also comprise other hardware units/modules 14 coupled to system bus 46 for performing additional functions. Processor subsystem 11 may comprise one or more processors and a controller device that incorporates a set of functions including a system memory controller, support for one or more system buses and direct memory access (DMA) engines.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, a set of new routing attributes are provided that may be incorporated in any protocol used for routing of packet-based calls to a telephony destination. By way of example, existing protocol such as TGREP (and/or TRIP) may include these new routing attributes as an extension to the existing attribute set already defined. These new optional routing attributes describe packet-network routing characteristics of a network gateway device that help a network signaling element (e.g., a LS or pLS) make better, more accurate decisions in the routing of calls.

Figure 2:
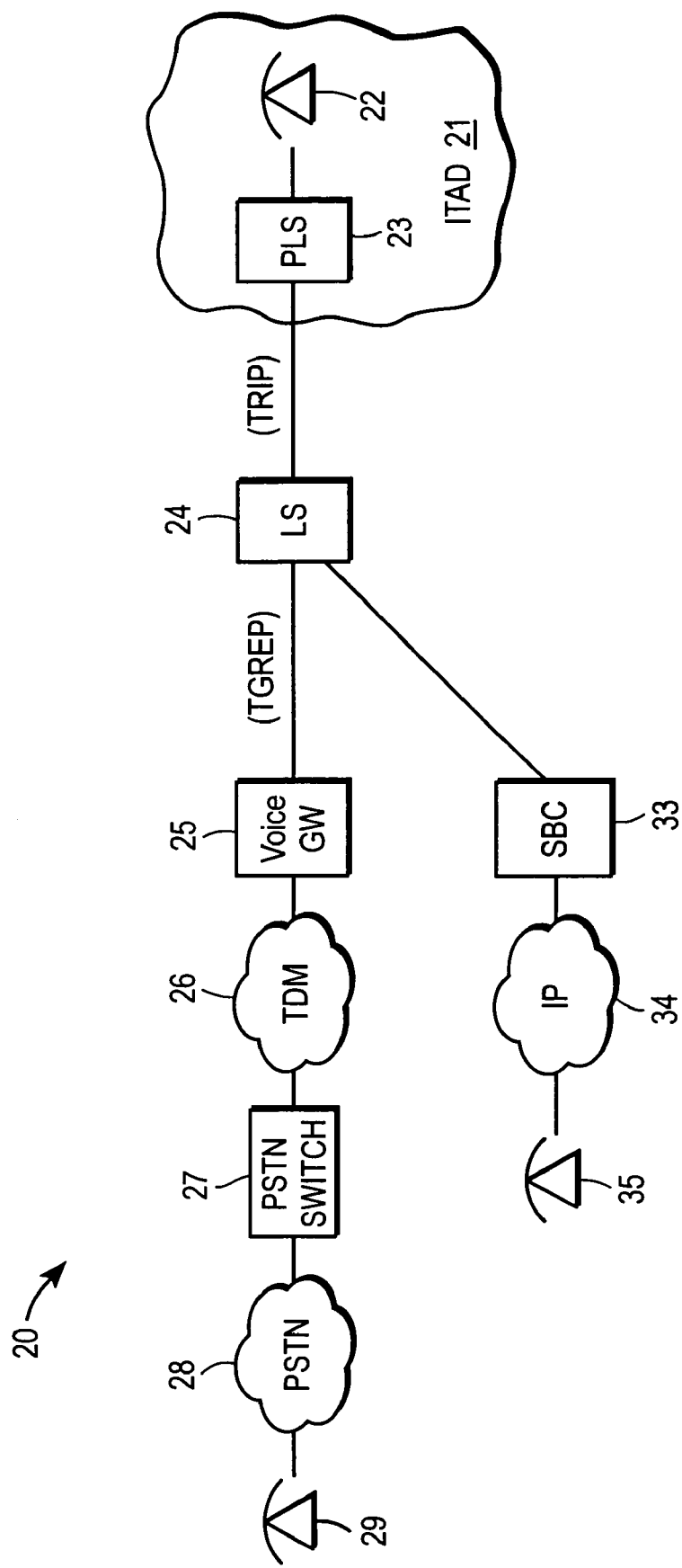
FIG. 2 is a network diagram in accordance with one embodiment of the present invention.

With reference now to FIG. 2, an exemplary diagram of a network 20 in accordance with one embodiment of the present invention showing an ITAD 21 that includes an end-point telephone device 22 connected with a pLS 23, which, in turn is connected with a LS 24 outside of the boundary of ITAD 21. In this example, LS 24 operates to forward calls from telephone device 22 to a destination endpoint (e.g., telephone device 29 or 35) via one or more gateways (GWs) and network connections. For instance, a call from telephone device 22 to device 29 may be forwarded by LS 24 through voice GW 25, then through a trunk connection with time division multiplexing (TDM) network 26. From there, the call may route through PSTN switch 27 and then through PSTN network 28 before finally reaching destination endpoint telephone device 29. Similarly, a call placed to telephone device 35—which, in this example, comprises an IP telephone device such as a VoIP phone—is forwarded by LS 24 through Session Border Controller (SBC) 33 and then through IP network 34. SBC 33 functions as a gateway between LS 24 and IP network 34. (A SBC is a device that controls real-time interactive communications—e.g., voice, video, and multimedia sessions—across an IP network border. It should be understood that in the context of the present application, the terms "gateway" and "SBC" should be considered to broadly refer to any IP-IP network border, including service provider (SP) to SP network borders, SP access network to backbone network borders, SP data center to managed network or Internet borders, and enterprise network to SP network borders.)

Practitioners in the art will appreciate that SBC 33 is a device that acts as if it were the called VoIP phone that places a second call to the called party. The effect of this behaviour is that not only the signaling traffic, but also the media traffic (voice, video, etc.) passes through SBC 33. As is well known, private SBCs are used along with firewalls to enable VoIP calls to and from a protected enterprise network. By way of example, SBC 33 may act as an IP-IP gateway between a SIP network and a network operating in accordance with a version of the H.323 packet-based protocol, i.e., packet interconnects with same or different protocols on the ingress/egress sides.

Figure 3:
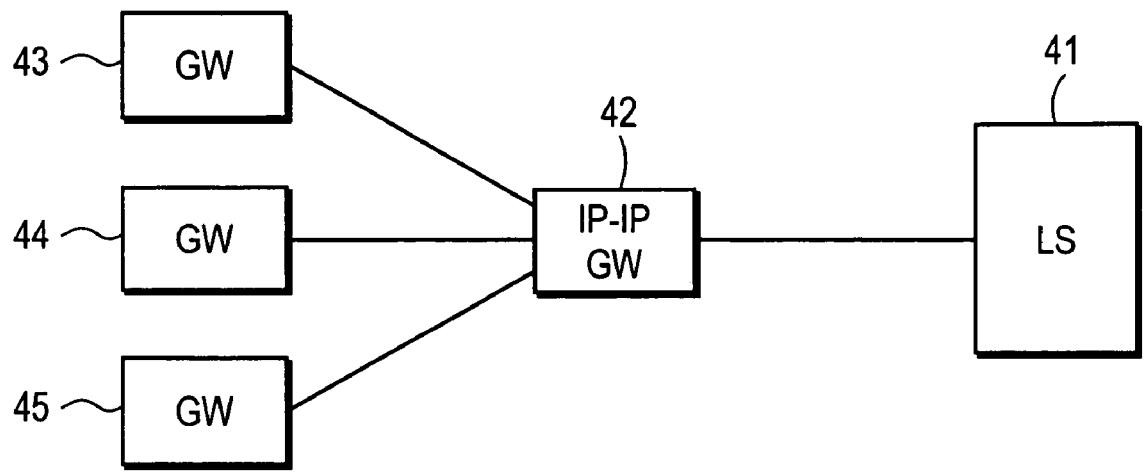
FIG. 3 shows two network segments of an exemplary network according to one embodiment of the present invention.

It should be understood that although only two gateways (e.g., 25 and 33) are shown connected with LS 24 in the diagram of FIG. 2, many more gateway devices may be connected with LS 24. Furthermore, multiple different routes or paths may be available to connect a call from telephone device 22 to a destination telephony device. In addition, more than one gateway device may exist along any given path or route, as is shown in the example of FIG. 3, described below.

In a specific implementation, LS 24 may manage/receive routes from other available LSs and GWs using an enhanced version of TGREP that includes the new attributes described below. On the proxy side, LS 24 may use TRIP in order to forward packets and provide route information back to populate the routing tables of pLS 23. When a call is placed by telephone device 22, pLS queries the next hop node (i.e., LS 24) to ask for route or path information to arrive at the destination based on the dialed number. On a hop-by-hop basis available routes are published or advertised between the various telephony network nodes, with LS 24 utilizing the route information to analyze and determine which route should be selected for a particular call. That is to say, IP-IP gateways (including SBCs) advertise their available routes to an associated peering LS so that the LS can make an intelligent decision regarding which route to select for a certain call, based on the attribute information provided in messages sent back to the LS.

In accordance with one embodiment, the routing protocol of the present invention includes new routing attributes that may be optionally utilized between gateway devices for the downstream packet network side of a gateway that comprises either a legacy gateway or an IP-IP gateway (e.g., such as SBC 33 in FIG. 2), or some combination of both. In one embodiment, the set of new attributes includes: TotalBandwidthCapacity, AvailableBandwidth, Packet|LossMeasurement, Packet|LatencyMeasurement, and RoundTripTimeMeasurement. It should be understood that alternative embodiments may include a subset of the above attributes, or other additional attributes extending beyond the set described herein.

The TotalBandwidthCapacity attribute identifies the total bandwidth that is available on a route to accommodate application traffic of all kinds, including traffic for calls. The total consumption of bandwidth resulted on the network after routing calls through the specified route on the gateway does not exceed the TotalBandwidthCapacity figure under a steady state condition. Thus, the TotalBandwidthCapacity attribute may be used to reflect the administratively provisioned capacity as opposed to the availability at a given point in time—the latter information being provided by the AvailableBandwidth attribute. Because of its relatively static nature, the TotalBandwidthCapacity attribute may be propagated beyond the LS that receives it; that is, this attribute may be forwarded to nodes located multiple hops down along a specified route or network path.

As mentioned above, the AvailableBandwidth attribute identifies the bandwidth that is currently available on a route to accommodate application traffic of all kinds, including traffic for calls. In other words, the additional consumption of bandwidth resulted after routing calls to the specified route on the gateway may not exceed the AvailableBandwidth value. If it does, the signaling protocol may generate errors, resulting in calls being rejected. Note that in a specific implementation, the AvailableBandwidth attribute is defined such that it used between a gateway and the peer LS responsible for managing that gateway. This means that if it is received by a node in a particular call route, it is not be propagated past the receiving node (e.g., LS).

The Packet|LossMeasurement, Packet|LatencyMeasurement and RoundTripTimeMeasurement attributes collectively identify the quality of service (QoS) aspects of calls on a given route from one gateway to another gateway. FIG. 3 shows, by way of example, an IP-IP gateway 42 connected with gateways 43-45. Gateway 42 is also included in a call route that includes LS 41, which peers with gateway 42. In other embodiments, LS 41 may comprise a proxy Location server (pLS). Additionally, it is appreciated that LS 41 (or a pLS) may peer directly with one or more additional voice gateways connected with a PSTN or other type of non-IP network. In operation, these three measurement attributes are produced in real-time at each of gateways 42-45 and constitute the measurement of call success rate on the downstream packet network side of the gateway. Specifically, these attributes respectively provide information about the number of packets lost on calls that have been connected through the associated route; the latency of packets traversing that network route or path associated with particular calls; and the total time it takes for packets to traverse the network from a calling device to a telephony destination device, and back again.

A gateway measures and reports the Packet|LossMeasurement, Packet|LatencyMeasurement and RoundTripTimeMeasurement attributes separately to its peering LS for each gateway to pair with. For instance, in the example shown in FIG. 3, IP-IP gateway 42 measures and reports these three attributes in corresponding messages to LS 41 for each gateway-to-gateway pair, i.e., gateways 42 & 43, gateways 42 & 44, and gateways 42 & 45. Such measurements are conducted based on call traffic between the two pairing gateways over a predetermined window of time (e.g., 100 ms).

In one embodiment, call routes may be originated containing the Packet|LossMeasurement, Packet|LatencyMeasurement and RoundTripTimeMeasurement attributes measured at a particular gateway. In other words, when routing a call from one gateway to another node or gateway (i.e., next-hop), the peering LS (and/or pLS) can take these QoS attributes into consideration to choose or select a better route for a particular call. In a VoIP network in which transfer of packets is achieved using the real-time transport protocol (RTP), the Packet|LossMeasurement, Packet|LatencyMeasurement and RoundTripTimeMeasurement attributes can be calculated with use of corresponding RTP control protocol (RTCP) reports across different RTP sessions over time. (RTCP is protocol associated with RTP that is useful for maintaining RTP session quality.)

Note that in another embodiment, the Packet|LossMeasurement, Packet|LatencyMeasurement and RoundTripTimeMeasurement attributes may be aggregated to produce a single QoS attribute, say, a CallQoS attribute. In certain situations this latter approach may simplify the reporting as well as the route decision process at the associated LS.

Figure 4:
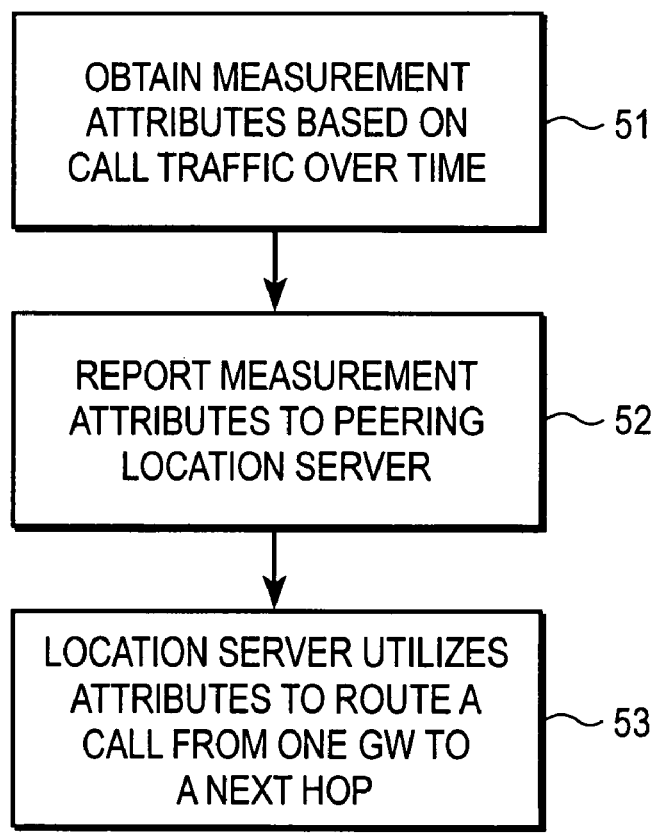
FIG. 4 is a flowchart that illustrates a method of operation in accordance with one embodiment of the present invention.

FIG. 4 is an exemplary flowchart that illustrates the basic operations executed at a gateway node, i.e. IP-IP gateway 42, in accordance with the above-described embodiment. In the example of FIG. 4, gateway 42 (see FIG. 3) first obtains measurement attributes (i.e., data corresponding to the Packet|LossMeasurement, Packet|LatencyMeasurement and RoundTripTimeMeasurement attributes) based on call traffic over a predetermined time (block 51) for each gateway-to-gateway pair. After the measurement attributes have been obtained, these attributes are reported (in corresponding messages) to its peering LS, which, in the example of FIG. 3, is LS 41. This step is depicted occurring in block 52 of FIG. 3. One or more processors associated with the Location Server then utilize the Packet|LossMeasurement, Packet|LatencyMeasurement and RoundTripTimeMeasurement attributes—along with the other attributes (e.g., the TotalBandwidthCapacity and AvailableBandwidth attributes—to characterize the various routes available in order to decide which route should be selected or chosen for routing a particular call (block 53). It is appreciated that the call may be routed through a wide variety of different types of gateways, e.g., voice gateways, IP-IP gateways, IP-PSTN gateways, etc.

Practitioners in the art will appreciate that the set of new routing protocol attributes described above capture important packet network characteristics useful in making call routing decisions. A signaling entity such as a LS or a pLS can then utilize the information made available by these attributes to make better decisions regarding which route to chose for routing a particular packet-based (VoIP) call.

It is further appreciated that use the new attributes described above is entirely optional when included as an extension or enhancement to an existing signal routing protocol, like TGREP or TRIP. For example, a routing protocol in accordance with the present invention may still route a certain call through a gateway having an interface with a traditional PSTN or ISDN without using the above set of attributes. In other cases, a network service provider may utilize the above attributes for the purpose of load balancing between multiple GWs.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Furthermore, although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A node for routing of calls in a network comprising:
    an interface coupled to the network;
    at least one processor operable to route a packet-based call to a telephony destination in accordance with a protocol that includes a set of attributes that describe packet-network routing characteristics of one or more Internet Protocol (IP)-IP gateway devices in the network, the attributes being used by the at least one processor to specify a call route through an IP-IP gateway device for the packet-based call, the set of attributes including:
        a first attribute that identifies a total administratively provisioned bandwidth capacity available on a given call route to accommodate application traffic;
        a second attribute that identifies a current bandwidth that is available on the given call route to accommodate the application traffic at a given point in time;
        a third attribute that provides information about a number of packets lost on calls that have been connected through the given call route;
        a fourth attribute that provides information about a latency of packets traversing the given call route; and
        a fifth attribute that provides information about a total time it takes for a packet to traverse the network from a calling device to the telephony destination, and back again.

2. The node of claim 1 wherein the node comprises a Location Server.

3. The node of claim 1 wherein the application traffic includes call traffic.

4. A method of operation for a location server (LS) of a telephony network, the method comprising:
    receiving information about available call routes through the telephony network advertised in accordance with a routing protocol that includes measurement attributes that identify quality of service (QoS) aspects of calls on a given call route, the measurement attributes including:
        a first attribute that identifies a total administratively provisioned bandwidth capacity available on the given call route through an IP-IP gateway device to accommodate application traffic;
        a second attribute that identifies a current bandwidth that is available on the given call route to accommodate the application traffic at a given point in time;
        a third attribute that provides information about a number of packets lost on calls that have been connected through the given call route;
        a fourth attribute that provides information about a latency of packets traversing the given call route; and
        a fifth attribute that provides information about a total time it takes for a packet to traverse the network from a calling device to the telephony destination, and back again;
    specifying a call route through the telephony network for a packet-based call based on information identified by the measurement attributes, including, the total administratively provisioned bandwidth capacity and the current bandwidth.

5. The method of claim 4 wherein the information about the available call routes is advertised on a hop-by-hop basis between various nodes of the telephony network.

6. The method of claim 4 wherein the application traffic includes call traffic.

7. A method of operation for a node of a telephony network, the method comprising:
    querying a next hop node to ask for call route information about available call routes through the telephony network to arrive at the destination based on a dialed number;
    receiving the call route information in accordance with a routing protocol that includes attributes that describe packet-network routing characteristics of one or more nodes in the telephony network, the attributes including:
        a first attribute that identifies a total administratively provisioned bandwidth capacity available on a given call route through an IP-IP gateway device to accommodate application traffic; and
        a second attribute that identifies a current bandwidth that is available on the given call route to accommodate the application traffic at a given point in time; and
        a third attribute that provides information about a number of packets lost on calls that have been connected through the given call route;
        a fourth attribute that provides information about a latency of packets traversing the given call route; and a fifth attribute that provides information about a total time it takes for a packet to traverse the network from a calling device to the telephony destination, and back again;

selecting a call route from one of the available call routes for a packet-based call based on information identified by the attributes, including, the total administratively provisioned bandwidth capacity, the current bandwidth, and the number of packets lost.

8. The method of claim 7 wherein the telephony network comprises a voice over IP (VoIP) network in which transfer of packets is achieved in accordance with the real-time transport protocol (RTP).

9. The method of claim 8 further comprising:
calculating the third, fourth, and fifth attributes using RTP control protocol (RTCP) reports across different RTP sessions over time.

* * * * *